United States Patent
Jacob et al.

(10) Patent No.: US 10,557,989 B1
(45) Date of Patent: Feb. 11, 2020

(54) SLOT ASSISTED GRATING BASED TRANSVERSE MAGNETIC (TM) TRANSMISSION MODE PASS POLARIZER

(71) Applicant: GLOBALFOUNDRIES INC., Grand Cayman (KY)

(72) Inventors: Ajey Poovannummoottil Jacob, Watervliet, NY (US); Marcus V. S. Dahlem, Santa Maria da Feira (PT); Humaira Zafar, Abu Dhabi (AE); Anatol Khilo, Lexington, MA (US); Sujith Chandran, Abu Dhabi (AE)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/194,902

(22) Filed: Nov. 19, 2018

(51) Int. Cl.
   *G02B 6/10* (2006.01)
(52) U.S. Cl.
   CPC .................. *G02B 6/105* (2013.01)
(58) Field of Classification Search
   CPC .. G02B 6/105; G02B 6/0056; G02B 6/02285; G02B 6/12023; G02B 2006/12116; G02B 6/126; G02B 6/27; G02B 6/2713; G02B 6/2726; G02B 6/276; G02B 6/2766; G02B 6/278
   See application file for complete search history.

(56) References Cited

U.S. PATENT DOCUMENTS 6,912,331 B2 * 6/2005 Fried ................ G02B 6/10
                                                  385/11

OTHER PUBLICATIONS

Guan et al., "Low loss ultracompact transverse magnetic pass polarizer with a Si subwavelength grating waveguide," Optics Letters, vol. 39 (15), 2014, 4 pages.
Kim et al., "Ultracompact transverse magnetic mode pass filter based on one dimensional photonic crystals with sub wavelength structures," Optics Express, vol. 24 (19), 2016, 6 pages.
Dai et al., "Integrated circuits with silicon hybrid plasmonic waveguides," SPIE Newsroom, DOI: 10.1117/2.1201410.005642, 2014, 4 pages.
Hu et al., "Ultrabroadband Compact Graphene-Silicon TM-Pass Polarizer," IEEE Photonics Journal, vol. 9 (2), 2017, 11 pages.

* cited by examiner

*Primary Examiner* — John Bedtelyon
(74) *Attorney, Agent, or Firm* — David Cain; Andrew M. Calderon; Roberts Mlotkowski Safran Cole & Calderon, P.C.

(57) ABSTRACT

The present disclosure relates to semiconductor structures and, more particularly, to a slot assisted grating based transverse magnetic (TM) pass polarizer and methods of manufacture. The structure includes: a waveguide strip composed of a first type of material and having openings along its length which are positioned to reflect/scatter a propagating electromagnetic waves; and grating fin structures on one or both sides of the waveguide strip which are positioned and structured to reflect/scatter the propagating electromagnetic waves.

20 Claims, 3 Drawing Sheets

US 10,557,989 B1

SLOT ASSISTED GRATING BASED TRANSVERSE MAGNETIC (TM) TRANSMISSION MODE PASS POLARIZER

FIELD OF THE INVENTION

The present disclosure relates to semiconductor structures and, more particularly, to a slot assisted grating based transverse magnetic (TM) pass polarizer and methods of manufacture.

BACKGROUND

A waveguide guides waves such as electromagnetic waves through a medium with minimal loss of energy by restricting its expansion. Without the physical constraint of a waveguide, wave amplitudes decrease according to the inverse square law as they expand into three dimensional space. Accordingly, the waveguide guides optical waves by total internal reflection.

Polarization in a TM (transverse magnetic) transmission mode or a TE (transverse electric) transmission mode are important in photonic integrated circuits for optical sensing, communication, and signal processing, as examples. The principle of the polarizer is to make one polarization of one type of transmission mode more lossy than another type of transmission mode.

Current polarizers require different waveguide dimensions (e.g., height and width) to transmit in either the TE polarized mode or TM transmission polarized mode. This adds complexity in device fabrication. Also, constant-radius bend polarizers have junctions with opposite signs of curvature, which leads to mode mismatch and subsequent scattering, elevating the insertion loss of the polarizer.

Moreover, current TM pass polarizers require high aspect ratio waveguides which are challenging to fabricate and/or require different device layer height for different wavelengths. In addition, grating based TM pass polarizers suffer from strong back reflection, where the TE mode lies in the photonic bandgap of the grating.

SUMMARY

In an aspect of the disclosure, a structure comprises: a waveguide strip composed of a first type of material and having openings along its length which are positioned to reflect/scatter propagating electromagnetic waves; and grating fin structures on one or both sides of the waveguide strip which are positioned and structured to reflect/scatter the propagating electromagnetic waves.

In an aspect of the disclosure, a structure comprises: a waveguide strip composed of a first type of material and comprising: a straight input end; a straight output end; and openings filled with a dielectric material along its length between the straight input end and the straight output end, and which are positioned to reflect/scatter transverse electric (TE) polarization; and grating fin structures on one or both sides of the waveguide strip which are positioned to reflect/scatter the transverse electric (TE) polarization.

In an aspect of the disclosure, a structure comprises: a strip waveguide fabricated on a silicon on insulator wafer, the strip waveguide comprising: a straight input and output; a fixed height and width; and periodic slots along its length between the input and the output, and which are filled with a dielectric material; and tapered and periodic grating fin structures on one or both sides of the waveguide strip, with the periodic slots being within the grating fin structures; and a buffer region below the strip waveguide and cladding oxide above the strip waveguide.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to a slot assisted grating based transverse magnetic (TM) pass polarizer and methods of manufacture. More specifically, the present disclosure describes a waveguide structure with a TM pass polarizer based on a compact slot assisted grating based TM pass polarizer with very low insertion loss and back reflection. Advantageously, the structures described herein can be scaled to a few micrometers (compared to millimeters in previous designs), in addition to eliminating back reflection and having low insertion loss with a high extinction ratio. The structures described herein are also tolerant to fabrication errors, e.g., processing errors.

The waveguide TM pass polarizer structures of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide TM pass polarizer structures of the present disclosure have been adopted from integrated circuit (IC) technology. For example, the waveguide TM pass polarizer structures are built on wafers and are realized in films of material patterned by photolithographic processes on the top of a wafer. In particular, the fabrication of the waveguide TM pass polarizer structures uses three basic building blocks: (i) deposition of thin films of material on a substrate, (ii) applying a patterned mask on top of the films by photolithographic imaging, and (iii) etching the films selectively to the mask.

Figure 1A:
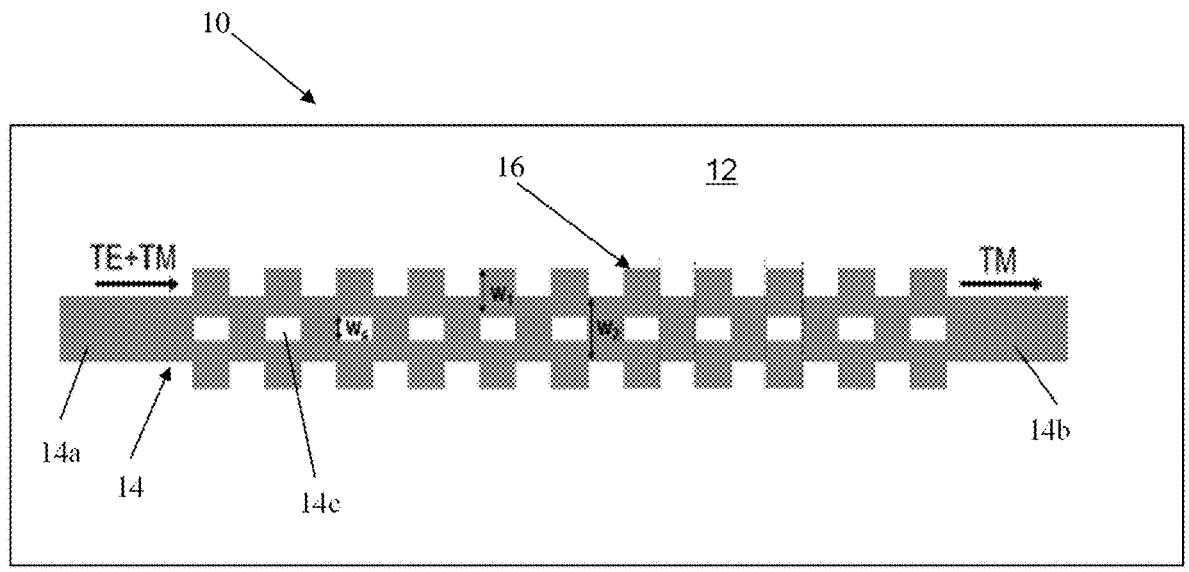
FIG. 1A shows a waveguide TM pass polarizer structure, amongst other features, and respective fabrication processes in accordance with aspects of the present disclosure.

FIG. 1A shows a waveguide TM pass polarizer structure, amongst other features, and respective fabrication processes in accordance with aspects of the present disclosure. More specifically, the structure 10 of FIG. 1A includes a waveguide structure (e.g., waveguide strip) 14 fabricated on a substrate 12. In embodiments, the substrate 12 can be a silicon on insulator (SOI) substrate or bulk Si, as examples. In an SOI implementation, the substrate 12 includes a semiconductor material bonded to an insulator layer. The semiconductor material can be composed of any suitable material including, but not limited to, Si, SiGe, SiGeC, SiC, GaAs, InAs, InP, and other III/V or II/VI compound semiconductors. The insulator layer can be a buried oxide material (BOX); although other insulator materials are also contemplated herein. The insulator layer is bonded to a semiconductor wafer.

The waveguide structure 14 preferably has a straight layout which includes a straight input end 14a, a straight output end 14b and a plurality of openings 14c along its length. The waveguide structure 14 can have a width of $W_2$. For example, the dimension $W_2$ can be about 200 nm; although other dimensions are also contemplated herein. The waveguide structure 14 can be of a fixed height and width (along its length) for any TM transmission (compared to the requirement of different device heights for different wavelengths).

The plurality of openings 14c can be hollow (e.g., filled with air) or filled with low refractive index dielectric material. In examples, the plurality of openings 14c can be filled with a $SiO_2$, Quartz, SiN or other dielectric materials with a refractive index of about 1.2-2.5. In further embodiments, the plurality of openings 14c can be placed in a periodic (constant) or non-periodic (non-constant) layout, with an interior dimension of $W_s$. In embodiments, and as further described herein, the dimension can be about 150 nm to about 200 nm; although other dimensions are contemplated herein. The spacing between adjacent openings 14c (or inside grating fin structures 16) can be about 200 nm; although other dimensions are contemplated herein.

Still referring to FIG. 1A, the openings 14c can be periodic slots, e.g., holes, gaps, voids, inside grating fin structures 16 (e.g., aligned with or offset from the grating structures 16). The grating structures 16 are preferably between the input end 14a and the output end 14b. The grating fin structures 16 can also be periodic or non-periodic on one or both sides of the waveguide 14. It should be understood by those of skill in the art that any combination of periodic or non-periodic grating fin structures 16 can be used with periodic or non-periodic openings 14c. In this way, the grating fin structures 16 can be aligned with and/or offset from the openings 14c.

Also, the grating fin structures 16 can be of a fixed height, e.g., same height as the waveguide structure 14; although other dimensions are contemplated herein. By way of example, the grating structures 16 can include a dimension $W_1$ of about 125 nm (and a length of about 400 nm); although other dimensions are contemplated herein. The grating fin structures 16 and the waveguide structure 14 can have some overlap in their dimensions. In addition, the grating fin structures 16 can include different shapes, e.g., rectangular, square, semi-spherical, tapered, etc., on one or both sides of the waveguide structure 14.

The waveguide structure 14 and grating fin structures 16 can be fabricated of Si, SiN, Poly-Si or any polymer waveguide materials, e.g., doped Si, doped poly and Ge doped Si materials. Moreover, the waveguide structure 14 and grating fin structures 16 can be fabricated from InAs or InP. In addition, the waveguide structure 14 and grating fin structures 16 can be fabricated in any material platform that allows building of planar photonic integrated circuits, e.g., bulk Si. By way of example, the waveguide structure 14 and grating fin structures 16 can be fabricated on a silicon on insulator (SOI) wafer, with the buried oxide (BOX) region (buffer region) below the waveguide structure 14. An oxide cladding can be provided above the waveguide structure 14 and grating fin structures 16.

In further embodiments, the grating fin structures 16 can be fabricated either with the same materials or different materials from the waveguide structures 14. For example, the grating fin structures 16 can be fabricated with (i) a metallic layer, e.g., gold, (ii) doped (heavily) silicon, (iii) doped (heavily) polysilicon, or (iv) germanium doped silicon. The grating fin structures 16 can also be of the same or different height as the waveguide structures 14, having a grating period varied for optimizing different wavelengths and/or extinction ratios. In any of these embodiments, the TM (transverse magnetic) polarized wave (light) and TE (transverse electric) polarized wave (light) can be inputted into the input end 14a of the waveguide structure 14, with the TE polarized wave (light) being reflected/scattered by the openings 14c and the grating fin structures 16 hence allowing only the TM polarized wave (light) to pass through the output end 14b of the waveguide structure 14.

The waveguide structure 14 and the grating fin structures 16 can be fabricated from the same material or different materials, including the same material as the substrate 12, e.g., semiconductor material. In the case that the waveguide structure 14 and the grating fin structures 16 are fabricated from the same material as the substrate, these features can be fabricated (patterned) by the same conventional lithography and etching processes, e.g., reactive ion etching (RIE). In the case that the waveguide structure 14 and the grating fin structures 16 are fabricated from the same materials (but not necessarily the substrate material), these features can be fabricated by the same conventional deposition, e.g., chemical vapor deposition (CVD) processes, followed by the same lithography and etching processes for patterning purposes. In the case that the waveguide structure 14 and the grating fin structures 16 are fabricated from different materials, these features can be fabricated by the separate deposition, lithography and etching processes.

As should be understood by those of skill in the art, conventional lithography and etching processes include a resist formed over the substrate 12, which is then exposed to energy (light) to form a pattern (opening). An etching process with a selective chemistry, e.g., reactive ion etching (RIE), will be used to form the patterns in the substrate 12 or other material, resulting in the formation of the waveguide structure 14 and the grating fin structures 16. The resist can be removed by a conventional oxygen ashing process or other known stripants.

Figure 1B:
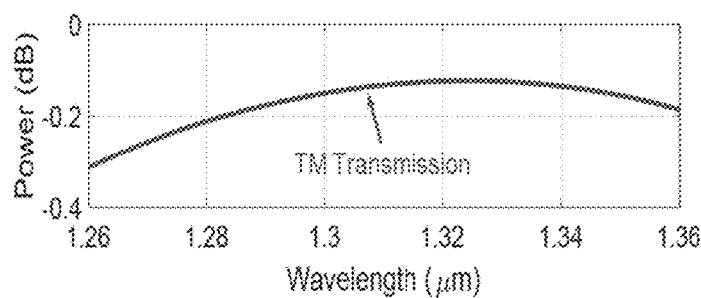
FIGS. 1B and 1C show performance graphs of the waveguide TM pass polarizer structure of FIG. 1A.
Figure 1C:
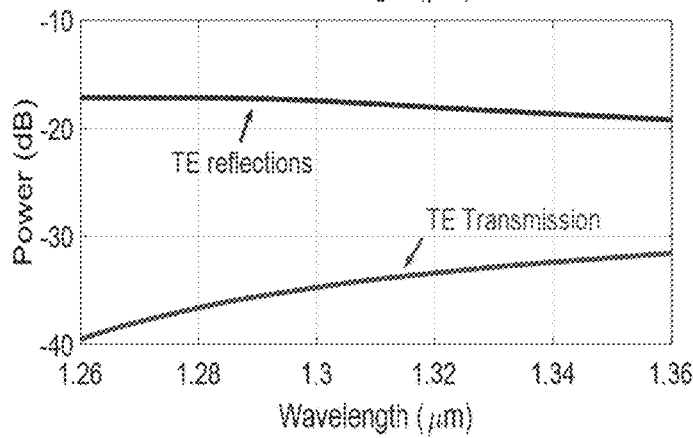

FIGS. 1B and 1C show performance graphs of the waveguide TM pass polarizer structure of FIG. 1A. More specifically, FIG. 1B shows a TM transmission and FIG. 1C shows TE transmission and reflection. In both graphs, the "x" axis represents wavelength (μm) and the "y" axis is power (dB). In particular, FIG. 1B shows an approximate TM transmission of greater than 95%; whereas, FIG. 1C shows an approximate TE transmission loss of 99%. It should be understood, though, that these transmissions and transmission losses can be modulated based on the particular construction of the waveguide TM pass polarizer structure of FIG. 1A, e.g., dimensions, materials, etc. Also, it should be understood that the results and numbers provided herein are merely an illustrative example and should not be considered a limiting feature of the present disclosure.

Figure 2A:
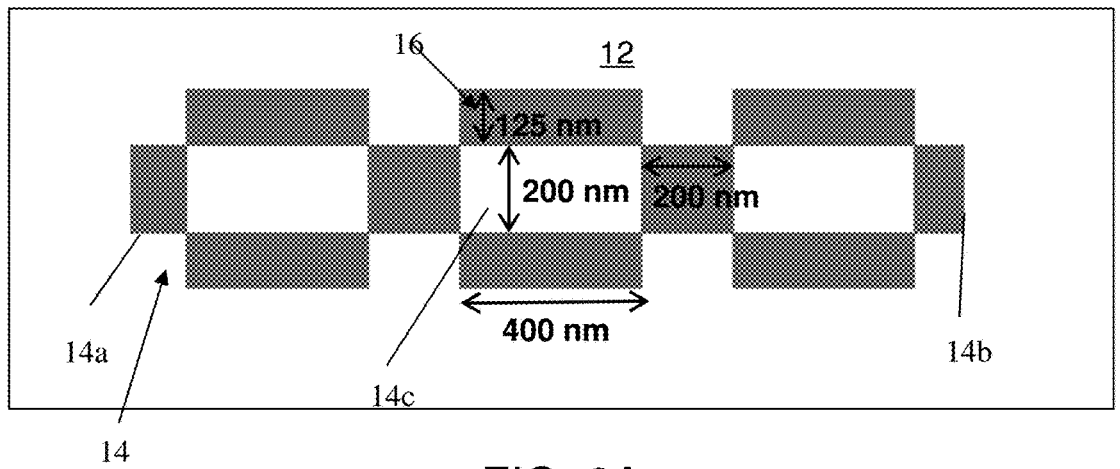
FIG. 2A shows an illustrative waveguide TM pass polarizer structure in accordance with aspects of the present disclosure.

FIG. 2A shows an illustrative waveguide TM pass polarizer structure in accordance with the present disclosure. In this representation, the grating fin structures 16 have a dimension of about 125 nm×400 nm, with a length of the waveguide structure 14 between the grating fin structures 16 of about 200 nm. In this representation, a width of the openings 14c is about 200 nm (and a length of 400 nm). The grating fin structures 16 and the openings 14c are periodic, with the grating fin structures 16 and openings 14c being in alignment. The total length of the illustrative waveguide TM pass polarizer structure is about 28 μm, and the area of the opening (closed space) is about 0.06 μm². It should be understood that the numbers provided herein are merely an illustrative example and should not be considered a limiting feature of the present disclosure.

Figure 2B:
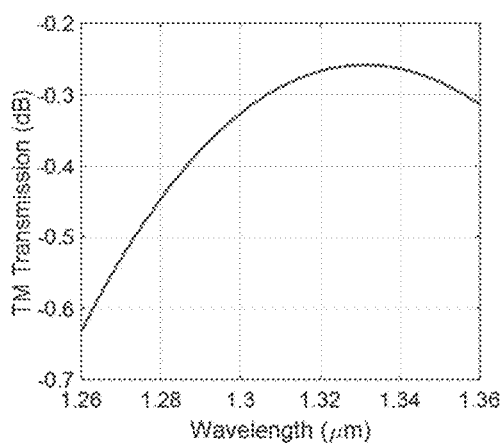
FIGS. 2B-2D show performance graphs of the waveguide TM pass polarizer structure of FIG. 2A.
Figure 2C:
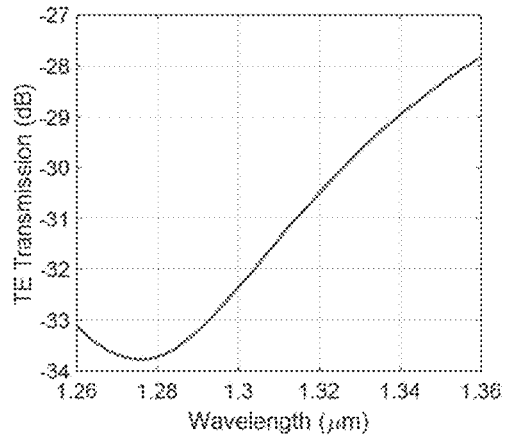
Figure 2D:
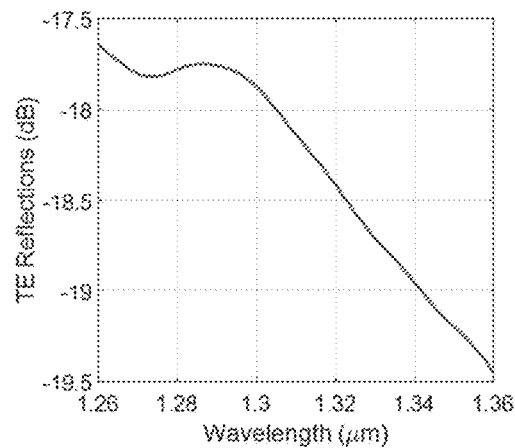

FIGS. 2B-2D show performance graphs of the waveguide TM pass polarizer structure of FIG. 2A. In each of the graphs, the "x" axis represents wavelength (μm). In FIG. 2B, the "y" axis is representative of a TM transmission (dB); whereas, in FIG. 2C the "y" axis is representative of TE transmission (loss) (dB) and, in FIG. 2D, the "y" axis is representative of TE reflections (dB). As shown in FIG. 2B, the TM transmission is greater than 90%. In FIG. 2C, the TE transmission loss is greater than 99% and, in FIG. 2D, the TE reflections are less than 2%. It should be understood that the results and numbers provided herein are merely an illustrative example and should not be considered a limiting feature of the present disclosure.

Figure 3A:
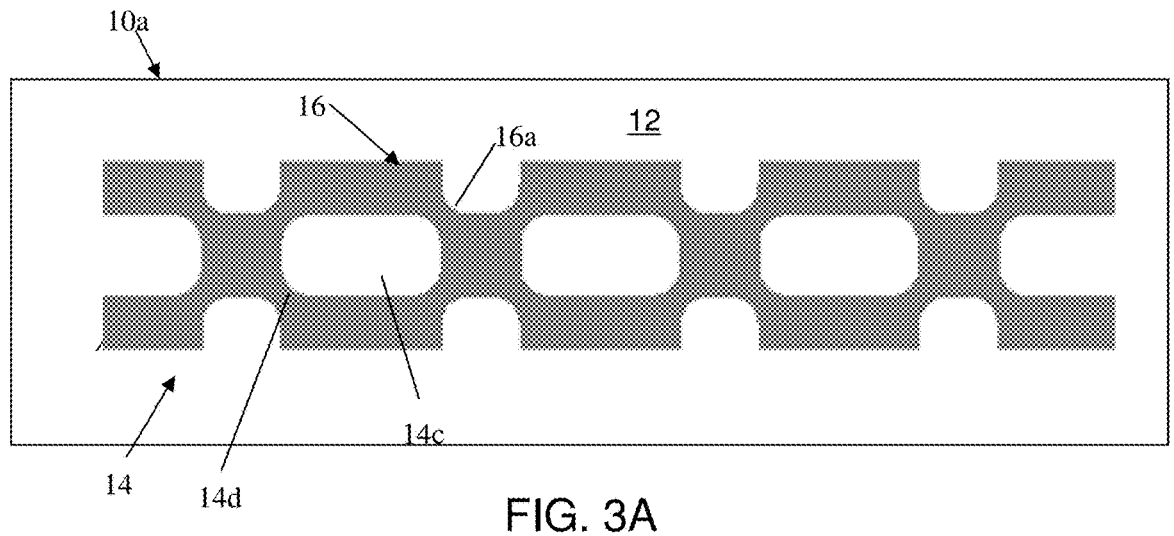
FIG. 3A shows a waveguide TM pass polarizer structure and respective fabrication processes in accordance with another aspect of the present disclosure.

FIG. 3A shows an illustrative waveguide TM pass polarizer structure 10a in accordance with additional aspects of the present disclosure. In this representation, the grating fin structures 16 have a tapered profile 16a. In addition, openings 14c are oval in shape, with tapered corners 14d. The dimensions of the grating fin structures 16 can be about 125 nm×400 nm, with a length of the waveguide structure 14 between the grating fin structures 16 of about 200 nm. In this representation, a width of the openings 14c is about 200 nm (and a length of 400 nm). The grating fin structures 16 and the openings 14c are periodic, with the grating fin structures 16 and openings 14c being in alignment. The total length of the illustrative waveguide TM pass polarizer structure is about 28 μm. Again, though, it should be understood that the numbers provided herein are merely an illustrative example and should not be considered a limiting feature of the present disclosure.

Figure 3B:
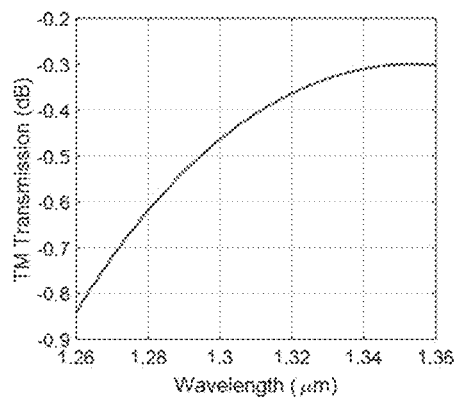
FIGS. 3B-3D show performance graphs of the waveguide TM pass polarizer structure of FIG. 3A.
Figure 3C:
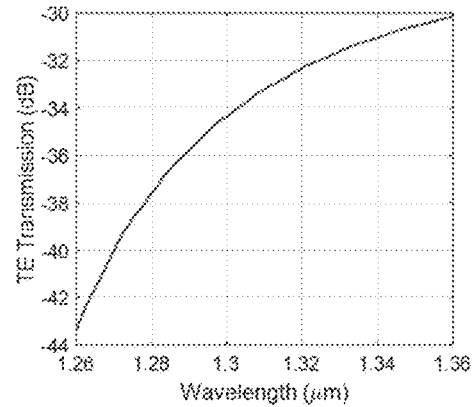
Figure 3D:
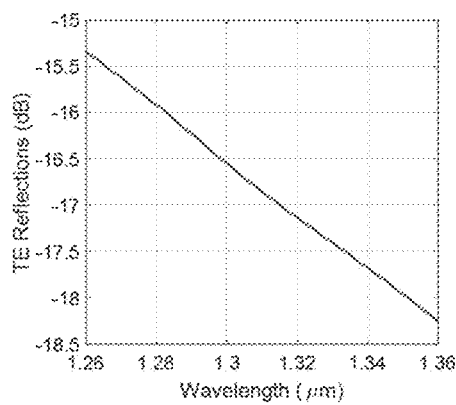

FIGS. 3B-3D show performance graphs of the waveguide TM pass polarizer structure of FIG. 3A. In each of the graphs, the "x" axis represents wavelength (μm). In FIG. 3B, the "y" axis is representative of TM transmission (dB); whereas, in FIG. 3C the "y" axis is representative of TE transmission (loss) (dB) and, in FIG. 3D, the "y" axis is representative of TE reflections (dB). As shown in FIG. 3B, the TM transmission is greater than 90%. In FIG. 3C, the TE transmission loss is greater than 99% and, in FIG. 3D, the TE reflections are less than 3%. Also, it should be understood that the results and numbers provided herein are merely an illustrative example and should not be considered a limiting feature of the present disclosure.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A structure, comprising:
a waveguide strip composed of a first type of material and having openings along its length which are positioned to reflect/scatter propagating electromagnetic waves;
grating fin structures on one or both sides of the waveguide strip which are aligned with the openings and positioned and structured to reflect/scatter the propagating electromagnetic waves;
a buffer region of semiconductor on insulator technologies located below the waveguide strip and grating fin structures; and
cladding oxide above the waveguide strip and the grating fin structures, wherein
an interior dimension of the openings is $W_s$,
a width of the waveguide strip is $W_2$,
a width of the grating structures is $W_1$,
$W_s$ less than or equal to $W_2$ and $W_2$ is greater than $W_1$,
the grating fin structures are composed of a second type of material different than the first type of material, and
the openings are filled with a dielectric material that is different than the first type of material.

2. The structure of claim 1, wherein the dielectric material is SiN or $SiO_2$.

3. The structure of claim 2, wherein the waveguide strip is straight and has a fixed height and width along its length.

4. The structure of claim 3, wherein the grating fin structures are periodic.

5. The structure of claim 4, wherein the openings are periodic or non-periodic.

6. The structure of claim 3, wherein the grating fin structures are non-periodic.

7. The structure of claim 6, wherein the openings are periodic or non-periodic.

8. The structure of claim 1, wherein the first type of material is semiconductor material.

9. The structure of claim 1, wherein the grating fin structures have a tapered profile.

10. The structure of claim 9, wherein the openings are oval shaped with tapered corners.

11. The structure of claim 1, wherein the propagating electromagnetic waves that are reflected and scattered are transverse electric (TE) polarization.

12. The structure of claim 1, wherein the grating fin structures are composed of (i) a metallic layer, (ii) doped silicon, (iii) doped polysilicon, or (iv) germanium doped silicon.

13. The structure of claim 12, wherein the grating fin structures are of a different height than the waveguide strip.

14. The structure of claim 13, wherein the grating fin structures have a tapered profile and the openings are oval in shape, with tapered corners.

15. A structure, comprising:
   a waveguide strip composed of a first type of material and comprising:
      a straight input end;
      a straight output end; and
      openings filled with a dielectric material of SiN or $SiO_2$ along its length between the straight input end and the straight output end, and which are positioned to reflect/scatter transverse electric (TE) polarization;
   grating fin structures on one or both sides of the waveguide strip which are positioned to reflect/scatter the transverse electric (TE) polarization;
   a buffer region of semiconductor on insulator technologies located below the waveguide strip and grating fin structures; and
   cladding oxide above the waveguide strip and the grating fin structures, wherein
   an interior dimension of the openings is $W_s$,
   a width of the strip waveguide is $W_2$,
   a width of the grating structures is $W_1$,
   $W_s$ less than or equal to $W_2$ and $W_2$ is greater than $W_1$.

16. The structure of claim 15, wherein the grating fin structures are periodic and the openings are periodic or non-periodic.

17. The structure of claim 15, wherein the grating fin structures are non-periodic and the openings are periodic or non-periodic.

18. The structure of claim 15, wherein the grating fin structures have a tapered profile.

19. The structure of claim 15, wherein the openings are oval shaped with tapered corners.

20. A structure comprising:
   a strip waveguide fabricated on a silicon on insulator wafer, the strip waveguide comprising:
      a straight input and output;
      a fixed height and width along its length; and
      periodic slots along its length between the input and the output, and which are filled with a dielectric material composed of oxide or nitride or quartz based materials;
      tapered and periodic grating fin structures on one or both sides of the waveguide strip, with the periodic slots being aligned and within the grating fin structures; and
   a buffer region below the strip waveguide and cladding oxide above the strip waveguide, wherein
   an interior dimension of the openings is $W_s$,
   a width of the strip waveguide is $W_2$,
   a width of the grating structures is $W_1$,
   $W_s$ less than or equal to $W_2$ and $W_2$ is greater than $W_1$.

* * * * *